United States Patent [19]

Hockaday et al.

[11] Patent Number: 5,231,683
[45] Date of Patent: Jul. 27, 1993

[54] ATTACHING OPTICAL FIBERS TO INTEGRATED OPTIC CHIPS

[75] Inventors: Bruce D. Hockaday, Vernon; Geary R. Carrier, Hampton, both of Conn.

[73] Assignee: United Technologies Corporation, Hartford, Conn.

[21] Appl. No.: 774,933

[22] Filed: Oct. 11, 1991

[51] Int. Cl.$^5$ ............................................. G02B 6/30
[52] U.S. Cl. ...................................... 385/49; 385/50
[58] Field of Search .................... 385/14, 49, 50, 51, 385/52, 2

[56] References Cited

U.S. PATENT DOCUMENTS

| | | | |
|---|---|---|---|
| 4,744,619 | 5/1988 | Cameron | 385/49 X |
| 4,796,975 | 1/1989 | Lukas et al. | 385/49 X |
| 4,871,226 | 10/1989 | Courtney et al. | 385/14 |
| 4,984,861 | 1/1991 | Suchoski, Jr. et al. | 385/2 |
| 5,071,215 | 12/1991 | Hockaday | 385/50 X |
| 5,073,002 | 12/1991 | Hockaday | 385/49 |

Primary Examiner—John D. Lee
Assistant Examiner—Phan T. Heartney
Attorney, Agent, or Firm—Richard H. Kosakowski

[57] ABSTRACT

A method of attaching an optical fiber to an IOC includes the step of preparing the IOC for attachment by utilizing a dicing saw to cut into the IOC at a depth less than the thickness of the IOC, the cut forming a surface which is normal or at an angle with respect to an optical axis of the waveguide, such step of cutting having the additional result of optically polishing the surface. A portion of the IOC between the initial cut and an end of the IOC is then progressively removed by a series of cuts using the dicing saw, the cuts are to a predetermined depth which is less than the thickness of the IOC, and greater than the radius of the fiber so as to insure proper coupling of the IOC waveguide and fiber core, such series of cuts producing a stepped surface in the IOC. Next, the fiber core is optically aligned with the waveguide by translational and rotational positioning of the fiber end face adjacent to the surface and above the stepped surface. The fiber end face is then secured to the cut surface with adhesive or other suitable means, and the fiber is attached to the stepped surface with adhesive or other suitable means.

7 Claims, 2 Drawing Sheets

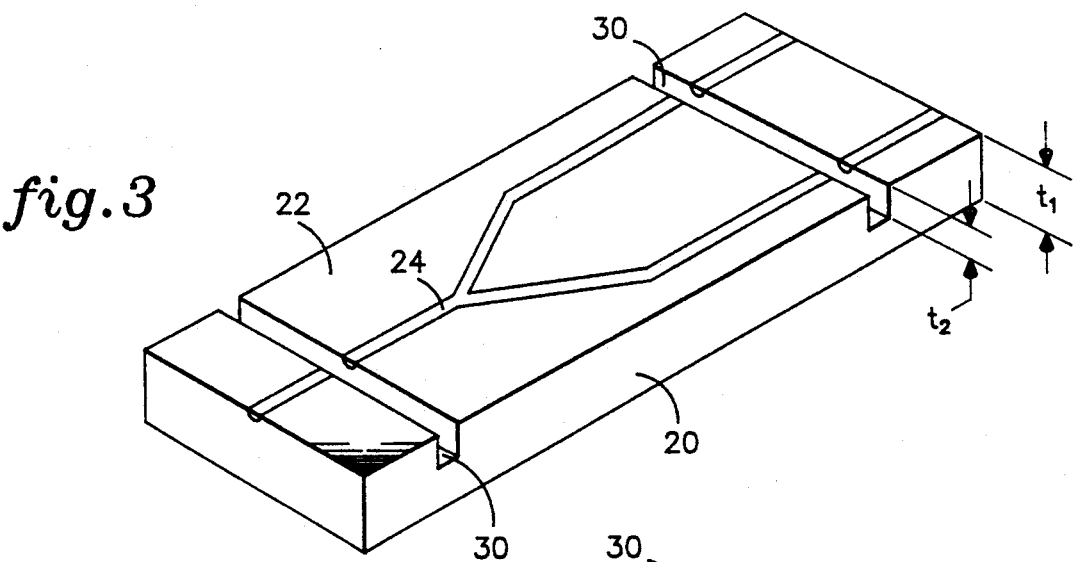
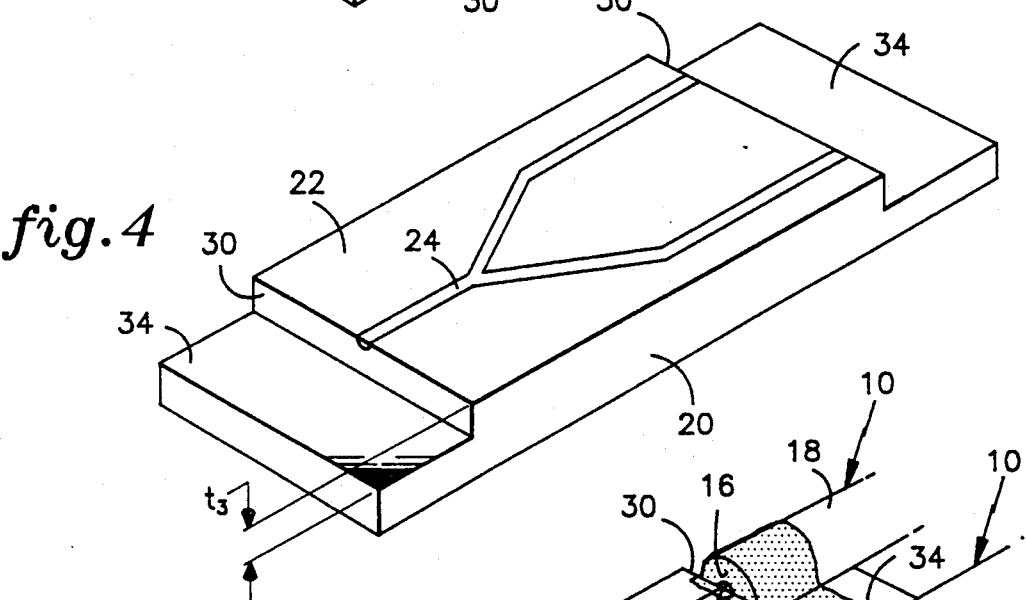
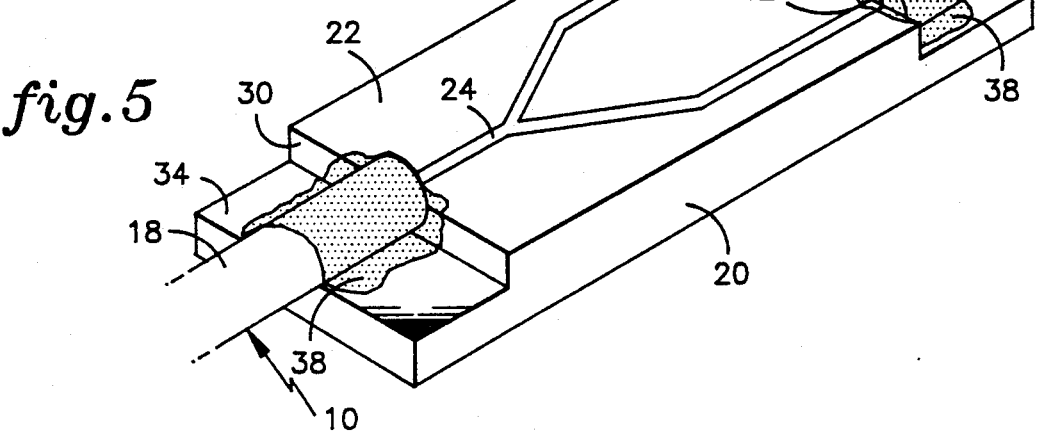

ATTACHING OPTICAL FIBERS TO INTEGRATED OPTIC CHIPS

TECHNICAL FIELD

This invention relates to integrated optics, and more particularly to attaching optical fibers to integrated optic chips.

BACKGROUND ART

In the art of attaching optical fibers to integrated optic chips (IOCs), it is critical that for maximum optical energy coupling between the fiber and IOC, a waveguide formed a surface of the IOC be in precise translational and rotational alignment with the fiber core before affixing the fiber to the IOC. Due to the typically small diameters (e.g., 2 to 10 microns) of both the core and waveguide, a small amount of misalignment therebetween may result in significant coupling loss of optical energy. As a result of this precise alignment constraint and of the relatively inefficient attachment methods existing in the prior art, attaching fibers to IOCs has heretofore been a time consuming process accounting for approximately 75 percent of the product cost.

For example, it is known in the art to use support blocks with V-grooves formed therein to support the fiber and provide a lateral and angular alignment of the fiber core and waveguide. However, this approach does not provide the desired precise alignment of each individual core and waveguide pair, and, furthermore, results in alignment instability over the desired operating temperature range.

It is also known to affix a support block to the IOC and attach the fiber with adhesive to both the IOC and block, as illustrated in U.S. Pat. No. 4,744,619 to Cameron. However, this method is inefficient in achieving the required precise optical alignment because of the use of elaborate micropositioner and imaging equipment apparatus. Also, use of positioners is labor and capital intensive, and does not allow simultaneous positioning of closely spaced optical fibers at the IOC output.

Further, U.S. Pat. No. 4,871,226, to Courtney et al. and assigned to the assignee of the present invention, teaches a procedure for attaching a fiber to the IOC which first involves polishing the end face(s) of the IOC to an optical finish. It has been found that to increase the optical energy coupling efficiency between the fiber and IOC, the IOC end face surface must be a knife edge and not be rounded to any relative extent. Polishing accomplishes this knife edge. The procedure also teaches the use of carrier blocks for the fibers which attach to the corresponding IOC end faces.

However, it has been found that the procedure in Courtney et al. does not produce an attachment of the fiber to the IOC so as to be able to maintain the precise alignment across the entire MIL SPEC temperature or mechanical shock range. Further, the procedure is labor-intensive, time-consuming, and difficult to automate, requiring a relatively high degree of skilled labor to insure its success.

DISCLOSURE OF INVENTION

Objects of the present invention include provision of an inexpensive and time-saving method of attaching an optical fiber in precise optical axis alignment to a waveguide in an IOC.

Further objects of the present invention include provision of a method of attaching an optical fiber in precise optical axis alignment to a waveguide in an IOC, such attachment maintaining such precise alignment across a wide (e.g., MIL SPEC) temperature and mechanical shock range.

According to the present invention, a method of attaching an optical fiber to an IOC includes the step of preparing the IOC for attachment by utilizing a dicing saw to cut into the IOC at a depth less than the thickness of the IOC, the cut forming a cut surface in the IOC which is normal or at an angle with respect to an optical axis of the waveguide, such step of cutting having the additional result of optically polishing and providing a knife edge on the cut surface; next, a portion of the IOC between the cut surface and an end of the IOC is removed by a series of cuts using the dicing saw, the cuts are to a predetermined depth which is less than the thickness of the IOC and greater than the radius of the fiber so as to insure proper coupling of the IOC waveguide and fiber core, such series of cuts producing a stepped surface in the IOC; next, the fiber core is optically aligned with the waveguide by translational and rotational positioning of the fiber end face adjacent to the cut surface and above the stepped surface; the fiber end face is then secured to the cut surface with adhesive or other suitable means, and the fiber is attached to the stepped surface with adhesive or other suitable means.

The method of the present invention achieves precise alignment of the core of an optical fiber to a waveguide in an inexpensive and time-saving manner. Specifically, manufacturing and assembly time are significantly reduced over prior art methods. At the same time, such precise alignment is maintained across a wide temperature and mechanical shock range. The present invention thus facilitates the production of IOC devices such as fiber optic gyros in large quantities on a commercial basis.

These and other objects, features and advantages of the present invention will become more apparent in light of the detailed description of a best mode embodiment thereof, as illustrated in the accompanying drawings.

BRIEF DESCRIPTION OF DRAWINGS

FIG. 3 is a perspective view of the IOC of FIG. 2 as operated on by a step in the method of the present invention;

FIG. 4 is a perspective view of the IOC of FIG. 2 as operated on by a further step in the method of the present invention; and FIG. 5 is a perspective view of a number of fibers, similar to the fiber of FIG. 1, attached to the IOC as in FIG. 4 as a result of the method of the present invention.

BEST MODE FOR CARRYING OUT THE INVENTION

Figure 1:
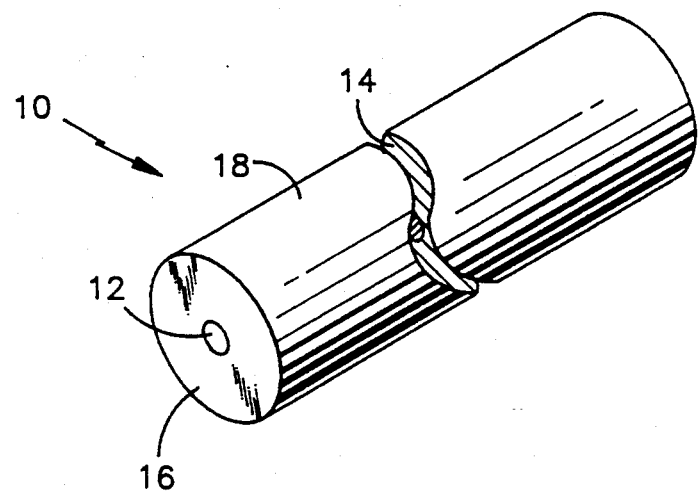
FIG. 1 is a perspective view of a portion of an optical fiber.

In FIG. 1 is illustrated a perspective view of a portion of an optical fiber 10. The fiber 10 typically comprises a commercially available, single mode fiber, having a core diameter in the range of, e.g., 2 to 10 microns. The fiber has an inner core portion 12, through which light is constrained to travel by an outer cladding portion 14 of different refractive index than that of the core 12. Also illustrated is an end face 16 of the fiber, which is normally cleaved or optically polished by suitable means, and a fiber outer surface 18. The overall diameter of the fiber may be approximately 125 microns.

Figure 2:
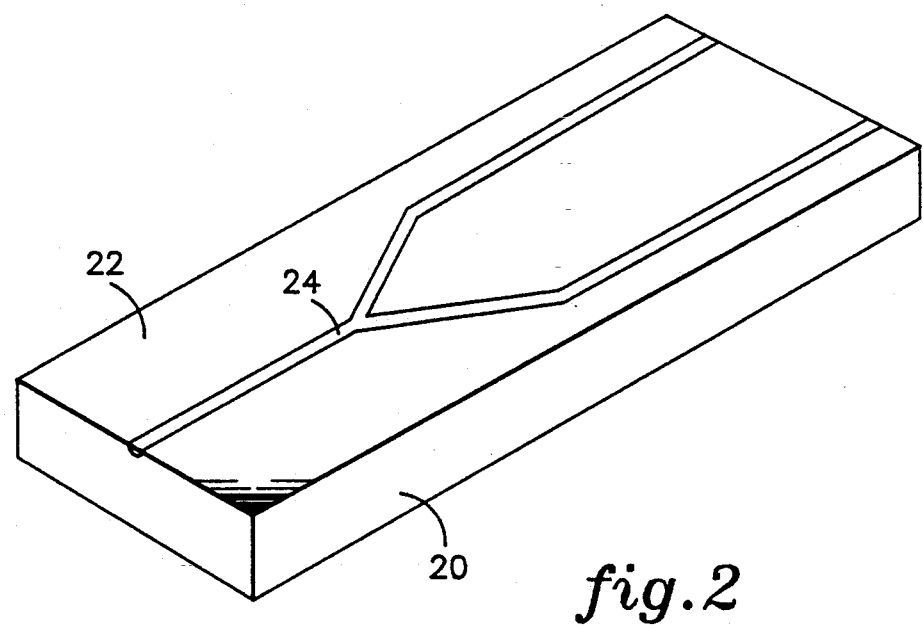
FIG. 2 is a perspective view of an IOC.

In FIG. 2 is illustrated a perspective view of a rectangular-shaped IOC 20 fabricated from, e.g., X-cut, Y-propagation lithium niobate, $LiNbO_3$. However, the IOC is not limited as such; rather, the IOC may be of other cuts and associated propagations. For example, if desired, the IOC may comprise other suitable material or crystal cuts such as lithium tantalate, $LiTaO_3$, or Z-cut lithium niobate.

The IOC 20 has formed on a top surface 22 a, e.g., Y-shaped optical waveguide 24. The waveguide 24 may be formed by means well known in the art, such as proton exchange or titanium indiffusion, or by an annealed proton exchange ("APE TM") method disclosed and claimed in U.S. Pat. No. 4,984,861 to Suchoski, Jr. et al. and assigned to the assignee of the present invention, the Suchoski, Jr. et al. patent being hereby incorporated by reference.

A simple Y-shaped waveguide is illustrated. It is to be understood, however, that the shape or form of the waveguide is irrelevant to the broadest scope of the present invention; the IOC may have any type or form of waveguide, along with other well known devices (e.g., light energy phase modulators) formed on an IOC surface in accordance with well known techniques.

Referring to FIG. 3, the IOC is prepared for attachment to the fiber by utilizing a commercially available dicing saw or other suitable cutting means to cut into the IOC to form a planar surface 30 which is normal or at an angle with respect to an optical axis of the waveguide 24. Illustrated in FIG. 3 is a similar cut and resulting planar surface 30 on each side of the rectangular-shaped IOC. However, it is to be understood that the number of such cuts in the IOC is irrelevant to the broadest scope of the present invention; the number of cuts is dependent upon the number and location of the desired fiber attachment points to the waveguide.

The cut is at a depth, $t_2$, which is less than the entire thickness, $t_1$, of the IOC. For a typical IOC thickness of 500-1000 microns, the depth of cut may be, e.g., 100 microns. However, it is to be understood that the depth of cut as described herein is purely exemplary; the depth depends upon the thickness of the IOC and the diameter of the fiber. A suitable depth of cut is easily obtainable in light of the teachings herein.

It has been found that the aforementioned step of cutting with a dicing saw has the additional result of producing an optically-polished, knife edge surface. Thus, this step of cutting eliminates the labor-intensive and time-consuming step of polishing, as taught by the aforementioned Courtney et al. patent, which is hereby incorporated by reference. Further, it is very difficult, if not impossible, to sufficiently polish a stepped surface by conventional polishing means, such as the surface illustrated in more detail herein with respect to FIG. 4.

Referring to FIG. 4, the next step in the method of the present invention involves removing a portion of the IOC material between the initial cut illustrated in FIG. 3 and an end of the rectangular-shaped IOC. The portion is progressively removed by a series of cuts using the dicing saw or other suitable cutting means. The cuts are to a depth, $t_3$, such depth may be either equal to, less than, or greater than the initial cut, $t_2$, but in any event less than the thickness, $t_1$, of the IOC, and greater (typically by a slight margin) than the radius of the fiber so as to insure proper coupling of the IOC waveguide to the fiber core. An exemplary depth of cut, $t_3$, for the series of cuts is 150 microns, given an initial cut depth, $t_2$, in FIG. 3 of 100 microns. Illustrated in FIG. 4 is the IOC having a portion on each of two sides thereof removed by this series of cuts. The series of cuts produce a stepped surface 34 in the IOC, the stepped surface 34 being that which one or more of the optical fibers 10 are subsequently attached to.

Next, the fiber core 12 is optically aligned with the optical axis of the waveguide 24 by translational and rotational positioning of the fiber end face 16 adjacent to the cut surface 30 and above the stepped surface 34. The positioning may be carried out by any suitable known automatic or manual means. For example, light from a laser or light emitting diode (LED) may be directed into the end of the fiber core not positioned adjacent to the cut surface. A light detector is placed at an output of the waveguide. The position of the fiber core relative to the waveguide is then adjusted for a desired (i.e., maximum) optical energy coupling efficiency as determined by the detector.

Next, at the maximum coupling efficiency, the fiber end face 16 is secured to the cut surface 30 with an adhesive, such as an ultraviolet (UV) light-curable optical epoxy. If desired, however, the epoxy may be applied to the fiber end face before positioning of the fiber is undertaken. In any event, once the desired positioning of the fiber with respect to the waveguide is achieved, the optical epoxy is cured by exposure to UV light.

As a final step in the method of the present invention, the fiber 10 is attached to the step surface 34 with a commercially available high strength adhesive 38 or other suitable means, such as available from Epoxy Technology. In FIG. 5 is illustrated the IOC 20 of FIG. 4 having three (3) optical fibers 10, as illustrated in FIG. 1, bonded thereto with the high strength adhesive in such a manner.

Since the depth of the aforedescribed series of cuts is 150 microns, and since the fiber diameter is approximately 125 microns (62.5 micron radius), the resulting air gap between the fiber outer surface 18 and the stepped surface is approximately $150-62.5 = 87.5$ microns. In applying the high strength adhesive to the stepped surface, enough of the adhesive is applied so as to fill this 87.5 micron air gap. Application of the adhesive in such a manner provides for a high strength mechanical attachment of the fiber to the IOC. The adhesive 38 is also applied so as to cover the entire fiber outer surface as well as a portion of the IOC surface 22.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

We claim:

1. A method of aligning a core of an optical fiber with an optical axis in a waveguide formed on a surface of an integrated optical chip (IOC) comprised of lithium niobate or other suitable material, and of attaching the fiber to the IOC, comprising the steps of:

cutting into the IOC with a dicing saw or other suitable cutting means at a depth less than the thickness of the IOC to form a cut surface which is normal or at an angle with respect to an optical axis of the waveguide, said step of cutting performing the additional function of optically polishing and providing a knife edge on said cut surface;

removing a portion of the IOC between said cut surface and an end of the IOC by a series of cuts using the dicing saw or other suitable cutting means, said series of cuts are to a predetermined depth which is less than the thickness of the IOC and the greater than the radius of the fiber so as to insure proper coupling of the IOC waveguide and fiber core, said series of cuts producing a stepped surface in the IOC;

aligning optically the fiber core with the waveguide by translational and rotational positioning of the fiber end face adjacent to said cut surface and above said stepped surface;

attaching the fiber end face to said cut surface with adhesive or other suitable means; and attaching the fiber outer surface to said stepped surface with adhesive or other suitable means.

2. The method of claim 1, wherein said step of aligning optically the fiber core and waveguide further comprises the steps of:

transmitting an optical energy signal through the fiber core and into the waveguide;

monitoring the magnitude of said optical energy signal after passing through the fiber core and waveguide;

adjusting the optical fiber with respect to the waveguide so as to maximize said monitored magnitude of said optical energy signal.

3. A method of attaching an optical fiber to an integrated optical chip (IOC) comprised of lithium niobate or other suitable material, comprising the steps of:

cutting with a dicing saw or other suitable cutting means into the IOC at a depth less than the thickness of the IOC to form a cut surface which is normal or at an angle with respect to an optical axis of a waveguide formed on a surface of the IOC, said step of cutting performing the additional function of optically polishing said cut surface;

removing a portion of the IOC between said cut surface and an end of the IOC to form a stepped surface in the IOC;

aligning optically a core of the fiber with the waveguide by positioning the fiber end face adjacent to said cut surface and above said stepped surface;

attaching the fiber end face to said cut surface with adhesive or other suitable means; and attaching the fiber to said stepped surface with adhesive or other suitable means.

4. The method of claim 3, wherein said step of removing a portion of the IOC comprises the step of removing a portion of the IOC between said cut surface and an end of the IOC by a series of cuts using the dicing saw or other suitable cutting means, said series of cuts are to a predetermined depth which is less than the thickness of the IOC and greater than the radius of the fiber so as to insure proper coupling of the IOC waveguide and fiber core, said series of cuts producing a stepped surface in the IOC.

5. The method of claim 3, wherein said step of aligning optically the fiber core and waveguide further comprises the steps of:

transmitting an optical energy signal through the fiber core and into the waveguide;

monitoring the magnitude of said optical energy signal after passing through the fiber core and waveguide;

adjusting the optical fiber with respect to the waveguide so as to maximize said monitored magnitude of said optical energy signal.

6. Apparatus, comprising:

an integrated optical chip (IOC), having a waveguide formed on a surface thereof;

an optical fiber, having an inner core portion through which optical energy is constrained to travel, surrounded by an outer cladding portion;

characterized by:

a portion of said IOC being removed by utilizing a dicing saw or other cutting means to cut into the IOC at a depth less then the thickness of the IOC, said cutting forming a cut surface which is normal or at an angle with respect to an optical axis of said waveguide and which is optically polished;

a portion of said IOC between said cut surface and an end of said IOC being removed by a series of cuts using said dicing saw or other suitable cutting means, said series of cuts are to a predetermined depth which is less than the thickness of said IOC and greater than the radius of said fiber so as to insure proper coupling of said waveguide and said fiber core, said series of cuts producing a stepped surface in said IOC;

an end of said fiber being attached to said IOC such that said waveguide is in a desired translational and rotational position with respect to said fiber core.

7. Apparatus, comprising:

an integrated optical chip (IOC), having a waveguide formed on a surface thereof;

an optical fiber, having an inner core portion through which optical energy is constrained to travel, surrounded by an outer cladding portion;

characterized by:

said IOC having a portion removed between a desired location on said IOC and an end of said IOC, and at a depth less than the thickness of said IOC, said IOC having an optically polished cut surface at said desired IOC location which is normal or at an angle with respect to an optical axis of said waveguide, said IOC having a stepped surface between said cut surface and said IOC end, an end of said fiber being attached to said cut surface and said IOC stepped surface such that said waveguide is in a desired translational and rotational position with respect to said fiber core.

* * * * *

UNITED STATES PATENT AND TRADEMARK OFFICE
CERTIFICATE OF CORRECTION

PATENT NO. : 5,231,683
DATED : July 27, 1993
INVENTOR(S) : Bruce D. Hockaday et al It is certified that error appears in the above-identified patent and that said Letters Patent is hereby corrected as shown below:

Before "Technical Field", Column 1, Line 4, the following should have been inserted:

-- Cross Reference to Related Applications

Some of the subject matter disclosed and claimed herein is also disclosed and claimed in a commonly owned, copending U.S. patent application filed on even date herewith by Hockaday, et al., Serial No. 07/774,906, entitled Attaching Optical Fibers To Integrated Optic Chips.--

Signed and Sealed this

Twelfth Day of April, 1994

Attest:

BRUCE LEHMAN

Attesting Officer

Commissioner of Patents and Trademarks